United States Patent [19]

Målöy

[11] Patent Number: 5,606,659
[45] Date of Patent: Feb. 25, 1997

[54] METHOD AND SYSTEM FOR DEMOUNTING A CHAIN OF LINKED PROCESSES IN A DISTRIBUTED OPERATING SYSTEM

[75] Inventor: Jon P. Målöy, Solna, Sweden

[73] Assignee: Telefonaktiebolaget LM Ericsson, Stockholm, Sweden

[21] Appl. No.: 193,844

[22] Filed: Feb. 9, 1994

[30] Foreign Application Priority Data

Feb. 10, 1993 [SE] Sweden .................................. 9300431

[51] Int. Cl.⁶ .................................................. G06F 11/00
[52] U.S. Cl. .............................. 395/183.01; 395/183.15; 395/184.01
[58] Field of Search ..................... 371/7, 8.2, 11.3, 371/19, 20.1, 20.5, 20.6, 60, 68.3; 395/183.01, 183.15, 184.01, 185.03

[56] References Cited

U.S. PATENT DOCUMENTS

| | | | |
|---|---|---|---|
| 3,905,023 | 9/1975 | Perpiglia | 340/172.5 |
| 4,481,582 | 11/1984 | Edsbacker | 364/200 |
| 4,933,936 | 6/1990 | Rasmussen et al. | 370/859 |
| 4,937,825 | 6/1990 | Ballard et al. | 371/20.1 |
| 4,993,015 | 2/1991 | Fite, Jr. | 370/16 |
| 5,023,873 | 6/1991 | Stevenson et al. | 371/8.2 |
| 5,029,169 | 7/1991 | Smyk | 371/19 |
| 5,117,352 | 5/1992 | Falek | 395/575 |
| 5,129,080 | 7/1992 | Smith . | |
| 5,150,356 | 9/1992 | Tsutsui | 370/16.1 |
| 5,165,018 | 11/1992 | Simor | 395/300 |
| 5,193,181 | 3/1993 | Barlow et al. | 395/575 |
| 5,260,945 | 11/1993 | Rodeheffer | 371/8.2 |
| 5,291,494 | 3/1994 | Bruckert et al. | 371/11.3 |
| 5,394,542 | 2/1995 | Frey et al. | 395/575 |

FOREIGN PATENT DOCUMENTS

| | | |
|---|---|---|
| 0539130 | 4/1993 | European Pat. Off. . |
| 2079997 | 1/1982 | United Kingdom . |

*Primary Examiner*—Hoa T. Nguyen
*Attorney, Agent, or Firm*—Burns, Doane, Swecker & Mathis, L.L.P.

[57] ABSTRACT

For establishing two-way communication links between processes in a distributed operating system, the processes are provided with ports through which communication between the processes is performed. The processes and the ports make possible for the operating system to keep a check on processes having links and to use these links also if the process per se is terminated, and to discover an error in the process and terminate it. For enabling the operating system to be able to transmit via the links information regarding process or computer drop out and thus be able to propagate this information through the whole chain of linked processes, and to report this information to applications executed in the linked processes in order to enable these to undertake application specific measures, a code is used which is called at link abortion and communication errors. The function of this code includes terminating an erroneous process and reporting the error to an error handling code. The first mentioned code is always executing in a process to which an error has been reported.

14 Claims, 12 Drawing Sheets

| TYPE OF ERROR | ERRORS | ERROR DETECTION | ERROR CODE TO PORT-EXCEPTION-HANDLER | ERROR CODE TO ERROR-HANDLER | DEFAULT RECOVERY MEASURE |
|---|---|---|---|---|---|
| CONTEXT LOCAL ERRORS | EXECUTING ERRORS | COMPONENT/ CORE | — | ERROR SPECIFIC | TERMINATE CONTEXT |
| | | APPLICATION | — | ERROR SPECIFIC FOR CURRENT APPLICATION | TERMINATE CONTEXT |
| | ERRORS IN CASE OF SYSTEM CALLS | CORE | — | ERROR SPECIFIC | TERMINATE CONTEXT |
| COMMUNICATION ERRORS | LOST MESSAGE | TIME RELEASE IN IPC | REPLY NOT RECEIVED | REPLY NOT RECEIVED | TERMINATE CONTEXT |
| | | TIME RELEASE IN THE APPLICATION | — | ERROR SPECIFIC FOR CURRENT APPLICATION | — |
| | | SEQUENCE ENUMERATION | MESSAGE-LOST | MESSAGE LOST | TERMINATE CONTEXT |
| | WRONGLY ADDRESSED MESSAGE | RETURN MESSAGE | REMOTE PORT NOT AVAILABLE | REMOTE PORT NOT AVAILABLE | TERMINATE CONTEXT |
| | DISCONNECTED CONTACT | RETURN MESSAGE | REMOTE COMPUTER NOT AVAILABLE | REMOTE COMPUTER NOT AVAILABLE | TERMINATE CONTEXT |
| | | LINK SUPERVISION IN IPC | REMOTE COMPUTER NOT AVAILABLE | REMOTE COMPUTER NOT AVAILABLE | TERMINATE CONTEXT |
| CONTEXT EXTERNAL ERRORS | FAILURED CONTEXT | LINK ABORT | REMOTE PORT NOT AVAILABLE | REMOTE PORT NOT AVAILABLE | TERMINATE CONTEXT |
| | FAILURED LOCAL COMPUTER | INDICATION FROM COECC | REMOTE COMPUTER NOT AVAILABLE | REMOTE COMPUTER NOT AVAILABLE | TERMINATE CONTEXT |
| | FAILURED COMPUTER IN ANOTHER SUBNET | RETURN MESSAGE | REMOTE COMPUTER NOT AVAILABLE | REMOTE COMPUTER NOT AVAILABLE | TERMINATE CONTEXT |
| | | IPC LINK SUPERVISION | REMOTE COMPUTER NOT AVAILABLE | REMOTE COMPUTER NOT AVAILABLE | TERMINATE CONTEXT |
| | INFINITE LOOP IN A CALLED CONTEXT | TIME RELEASE | REPLY NOT RECEIVED | REPLY NOT RECEIVED | TERMINATE CONTEXT |
| | | LINK ABORT | REMOTE PORT NOT AVAILABLE | REMOTE PORT NOT AVAILABLE/LOOP | TERMINATE CONTEXT |

METHOD AND SYSTEM FOR DEMOUNTING A CHAIN OF LINKED PROCESSES IN A DISTRIBUTED OPERATING SYSTEM

BACKGROUND OF THE INVENTION

The present invention generally relates to handling processes and related resources in a distributed operating system.

With a process, in the present connection also called context, is here meant a resource in an operating system which needs to be used by a job for enabling it to execute program code in the process. The process provides the job with several indispensable resources, such as its own program counter, its own memory space, and its own set of processor registers. The process synchronizes jobs by only allowing one job at a time to execute.

By job is here meant, more generally, a phenomenon which is directed towards a process, so that a method in an object owned by the process is executed. A job can create new jobs directed towards other processes or to the own process.

U.S. Pat. No. 3,905,023 illustrates and describes a system including a multiple level operating system. The system is characterized as very big and extraordinarily complicated. The reliability of the system hardware is secured by the capacity of the multiple level operating system to reconfigurate the system modules dynamically and automatically in a suitable way. In all main modules of the system there are error detecting and error reporting circuits providing the operating system with information for performing error analyses and dynamic reconfiguration of the system resources. The memory modules are provided with "single bit" error correcting ability independently of the operating system. The operating system may be regarded as including a basic level and N consecutive levels. The basic level is defined as the core of the operating system. A process in each level of the operating system is responsible for the processes created on the nearmost higher level and not for any other ones. The operating system controls the system resources dynamically and plans job or tasks in a multiple program mixture. It reassigns resources, starts jobs and supervises their execution.

Great Britain Patent Document No. GB 2,079,997 relates to a distributed computer system with a plurality of systems connected to each other. Each one of the systems has a plurality of mutually connected elements. The systems include redundant elements with a distributed operating system for operating, error supervision and reconfiguration of functions while using vertical addressing. When an error is detected, the error is verified, the erroneous element is isolated and its task is assigned to another unoccupied element. If no other element should be available the system is reconfigurated for enabling deteriorated operation while using the available elements.

In U.S. Pat. No. 4,933,936 there is described a distributed computer system providing for flexible error tolerance. A distributed operating system is resident in all computers. Each computer is controlled by a resident copy of a common operating system.

SUMMARY OF THE INVENTION

In a computer it is desired that communication errors, or errors caused by erroneous programs, shall be able to be handled by the operating system of the computer in such a way that it is kept intact and that other programs and calls will not be affected by the error. An error shall at worst involve controlled disengagement of the chain of linked processes, or calls, where the error occurred. The effects of the error shall be completely isolated with respect to this call. In other words recovery of an arisen error must not include greater consequences for the system than those caused by the error itself.

A first object of the invention is to enable, in a distributed operating system, demounting of a chain of linked processes while returning as many memory and hardware resources as possible to the system.

A second object of the invention is to enable isolation of errors and limit their consequences, including the consequences of the recovery measures, only to the transaction/call in question, and thus if possible avoid computer restarts and influence on other calls.

A third object is to enable tracing of errors, irrespective of where these appear in the system.

A fourth object is to enable, in connection with system updating, type marking of certain activities for being able to control the execution of these towards the desired software version.

Generally according to the invention, for establishing twoway communication links between processes in a distributed operative system, the processes are provided with ports through which communication between the processes is performed. The processes and the ports make possible for the operating system to keep a check on processes having links and to use these links also if the process per se is terminated, and to discover an error in the process and terminate it. For enabling the operating system to be able to transmit via the links information regarding process or computer drop out and thus be able to propagate this information through the whole chain of linked processes, and to report this information to applications executed in the linked processes in order to enable for these to undertake application specific measures, a code is used which is called at link abortion and communication errors. The function of this code includes terminating an erroneous process and reporting the error to an error handling code. The first mentioned code is always executing in a process to which an error has been reported.

More particularly, a method according to the invention, for handling resources in a distributed operating system comprises the steps of providing two-way communication links between said processes and using said operating system for keeping up with processes having links, and using said links also if a process having links is terminated, detecting an error in a process and terminating it, transferring information via said links regarding process or computer failure, and propagating this information through a whole chain of linked processes, and reporting this information to applications executed in said linked processes for enabling these to perform application specific recoveries.

A system according to the invention comprises code means including first means for providing two-way communication links between processes, second means for enabling said operating system to keep up with processes having links, and to use said links also if a process is terminated, third means for enabling said operating system, or in certain cases a process itself, to detect an error in a process and terminate it, fourth means for enabling said operating system to transfer failure information via said links regarding process or computer failure, and to propagate this failure information through a whole chain of linked processes, and fifth means for enabling said operating system to report said failure information to applications executed in the linked processes in order to enable for these to perform application specific recoveries.

BRIEF DESCRIPTION OF THE DRAWINGS

The invention will now be described more closely with reference to embodiments schematically shown on the attached drawings, in which.

DETAILED DESCRIPTION

Swedish Patent Application No. 9300431-5, dated Feb. 10, 1993 and filed in the name of Ellemtel Utvecklings AB, Sweden, is hereby incorporated by reference in its entirety.

In the different Figures the same reference characters are used for illustrating the same or similar elements.

In the description below and on the drawings, expressions familiar to one skilled in the art relating to messages and communication may be used, as well as pseudo syntax expressions of a certain type. To the extent that they are not explained below, it is presumed that the skilled artisan does not require any closer explanation or translation of these expressions and syntax, respectively.

The concept of activity used below is used for defining a chain of jobs created in an operating system as a result of an independent external or internal event, plus the sum of the resources used by the chain during its execution.

Figure 1:
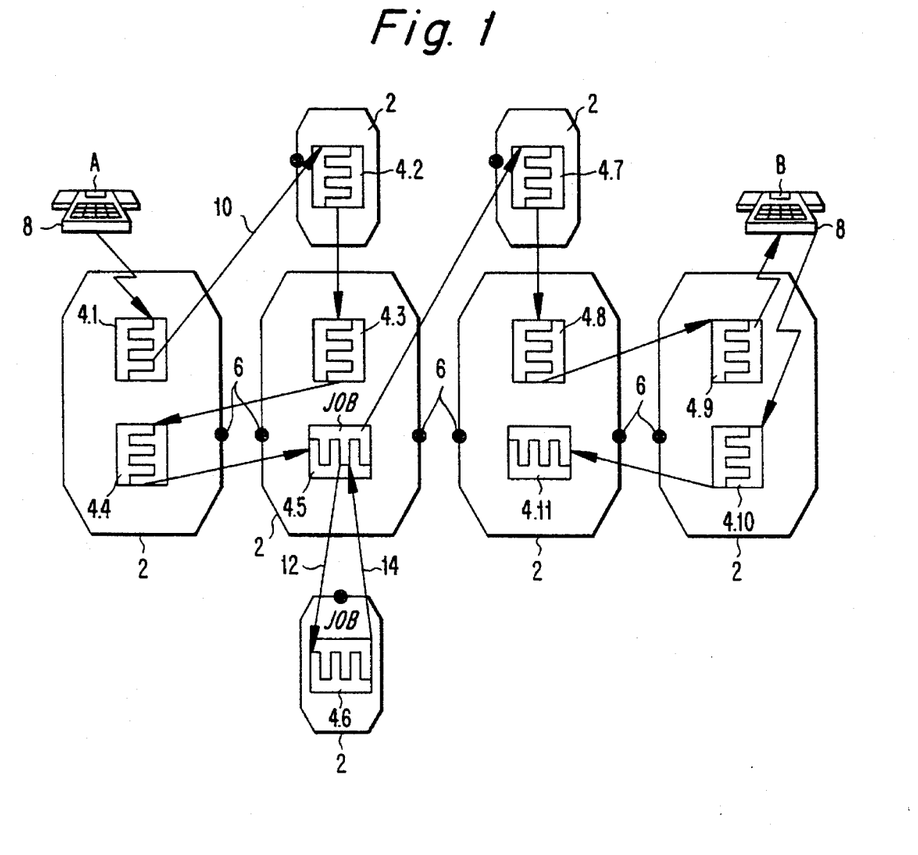
FIG. 1 illustrates an example of an activity in the form of a chain of jobs in a distributed operating system.

FIG. 1 shows a "log" of such a job chain which as an example is illustrated as arisen due to events in a telephone exchange between two telephone subscribers A and B. More particularly the Figure shows an activity in the form of a chain of jobs, and three of the types of resource an activity can attach to itself, viz. processes, ports and subscriber equipment. More particularly, processes are designated 2, jobs 4.n, ports 6, and subscriber equipment 8 in the Figure.

The arrows relate to different messages in the job chain, such as an asynchronous communication message 10, also called "cast" message, and synchronous messages in the form of call and reply messages 12 and 14. More particularly, with asynchronous messages are here meant such messages which a process sends and can continue its execution without waiting for response, whereas in the case of synchronous messages the process is locked until a reply has arrived. Each new "cast" message results in a new job, such as 4.2, which then very well can exist simultaneously with the job 4.1, which has created it. The call 12 also results in a new job 4.6, whereas the calling job 4.5 is temporarily suspended. Not until the new job 4.6 has stopped executing and has sent a reply message 14, the suspended job 4.5 may continue.

With an "independent" external event is meant an event not directed to any activity in the system. If the A-subscriber lifts the telephone receiver this is an independent event starting a new activity If the B-subscriber lifts the receiver it is not an independent event, since it is directed towards a call under erection and thereby towards an existing activity. If the A or B subscriber puts down the receiver the same is true.

Most internal events are not independent. If e.g. a debiting pulse is received this is the result of the fact that an activity has ordered a periodic time supervision, and has thus created a temporarily resting "timeout" job. This is included in the activity. Certain internal events should however be regarded as independent. This may apply to such as start of test activities from a test generator or triggered absolute time supervisions (of the type waking up, start of routine tests).

It is not necessarily so that a job in the chain directly has to have arisen in another job or a call via the communication mechanisms in the operating system. It may e.g. happen that, during a certain space of time, there is no job within the activity, either executing or waiting in some queue. In such cases it is only the link picture, which will be described more closely below, that defines the activity. If now a new job is started from some of the resources which exclusively belong to the activity, e.g. the line circuit of the B subscriber, also this job 4.10 belongs to the activity.

Figure 2:
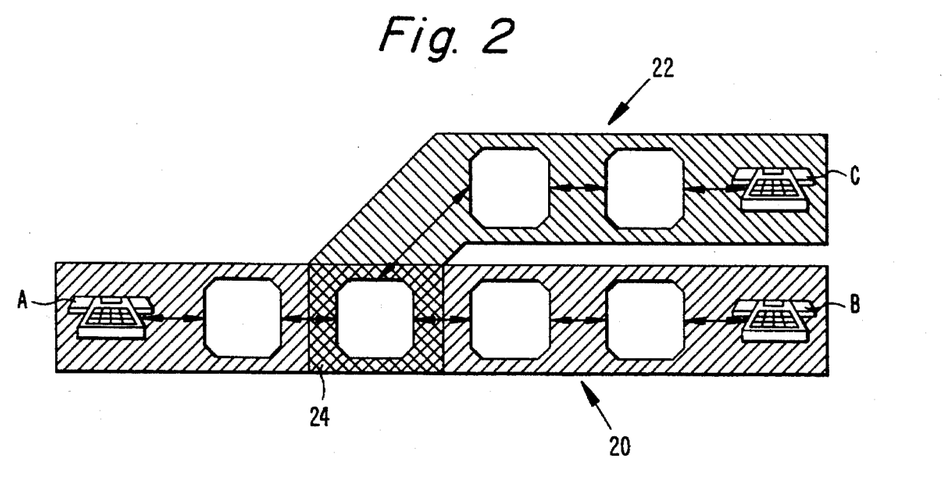
FIG. 2 illustrates examples of an activity group formed by several such activities.

Referring to FIG. 2, if an operator or a third party C wishes to be connected into the speech, the distinction between "independent" and "dependent" will be somewhat more difficult. It is true that the event is directed to an existing activity 20, but it results at first in the creation of a new activity 22. These two activities will then form an "activity group", shown schematically in FIG. 2, by the job chains "meeting" in the same resource, i.e. in the half call process 24 of A. It should however be observed that the fact that two activities share a resource is not a sufficient criterium for allowing that they shall form an activity group. Many activities (calls) shall of course share the access processes without being included in the same recovery domain for that reason.

A criterium good enough is presumably that activities sharing dynamic processes form an activity group, whereas those sharing static processes do not. Static processes are considered to be robust enough to be able to stand that an activity is recovered without this affecting the other ones sharing the process.

Figure 3:
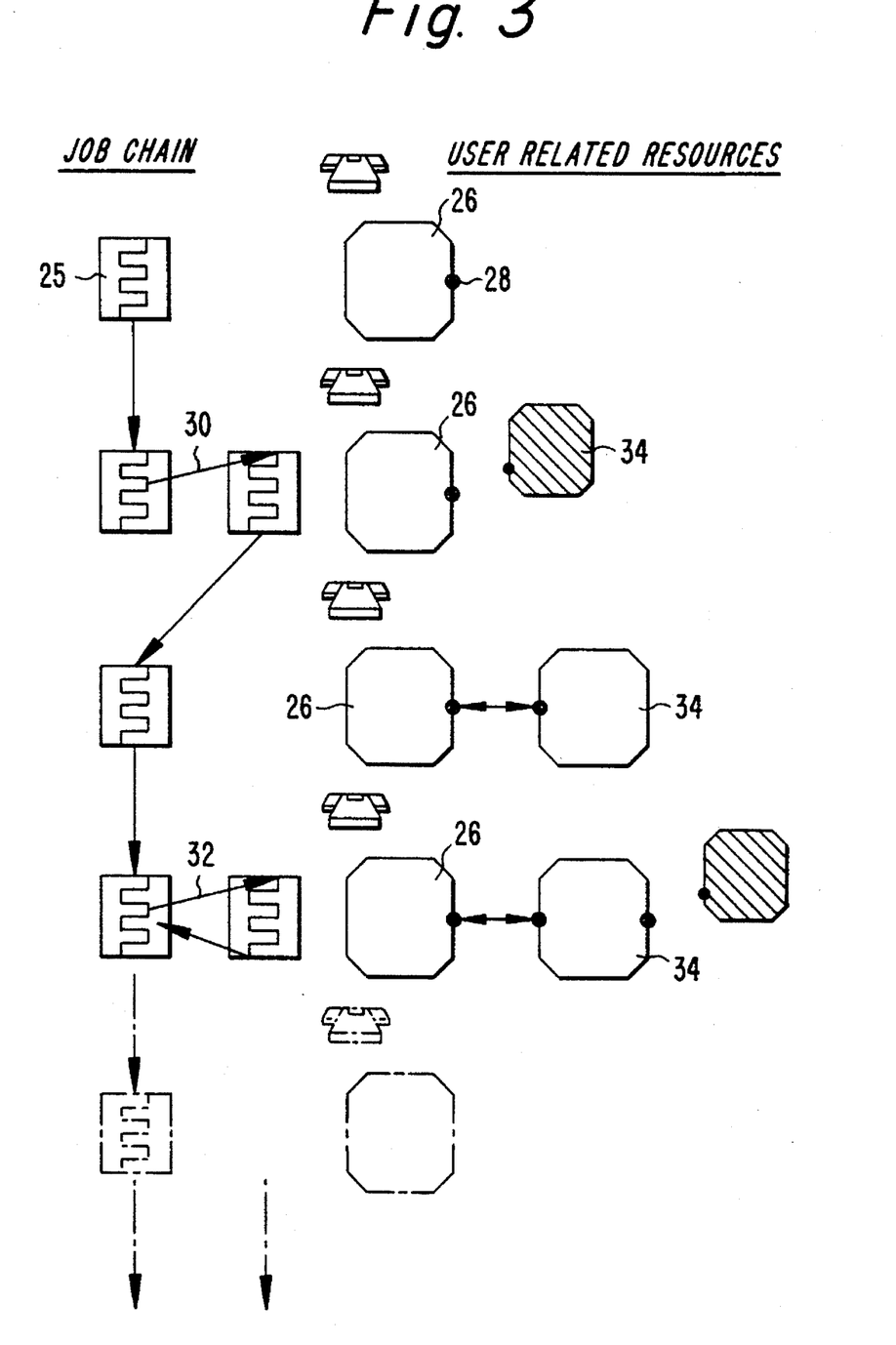
FIG. 3 illustrates how resources can belong to an activity for a shorter or longer time.

As is schematically illustrated in FIG. 3 the activity, during its lifetime, attaches different resources for shorter or longer time. A job 25 beginning to execute attaches e.g.

always a resource 26 of the type process. In many cases, e.g. static start processes, the process is released directly when the job terminates, but it may also be attached to the activity for a longer time, e.g. by there being created a port 28 to the process, so that new calls from the same activity can arrive at a later point of time, as is indicated at 30 and 32, and which e.g. may imply that a new process 34 is attached or disconnected, respectively.

Figure 4:
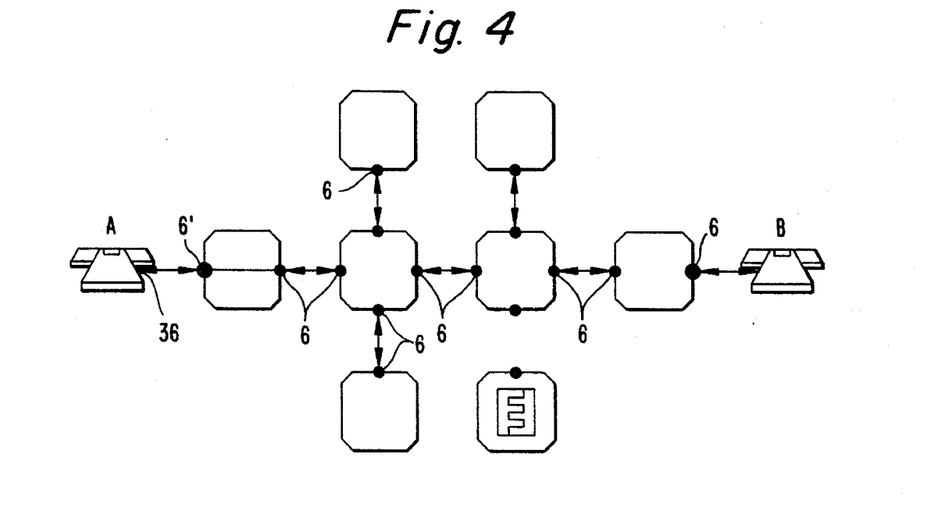
FIG. 4 shows a link representation view of an activity.

One important type of resource that the activity usually attaches is communication ports which belong to the communication mechanisms of the operating system. All ports belong to a process and each port has a reference to an opposite port. By linking together ports the activity may thus create a link picture according to FIG. 4, which keeps together the "owner" processes of the ports 6. In that way the activity may attach a process also during the time in which it has no job which shall be executed in it. Please observe, however, that this "attaching" does not imply any exclusive access to the process.

It is important to notice that a link picture is only something existing in the form of its nodes and links. Thus, there is no central or even distributed coordinating function which has knowledge of the extension and existence of the link pictures. The only knowledge of a link picture existing in the system is the limited information existing in each port (a node knows its immediate neighbours in the link picture).

Figure 6A:
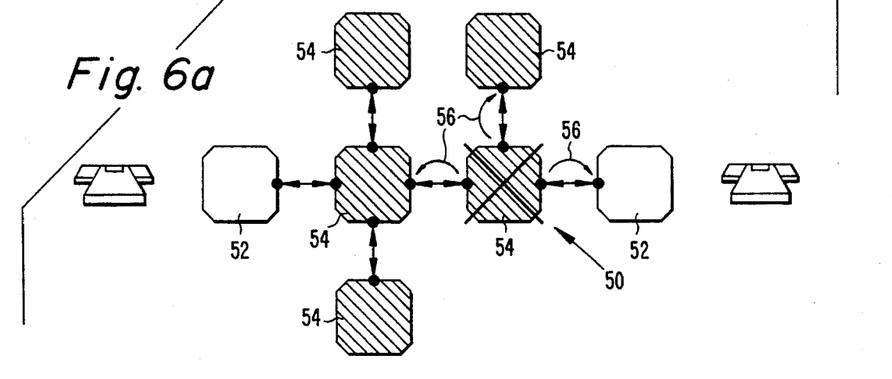
Figure 6B:
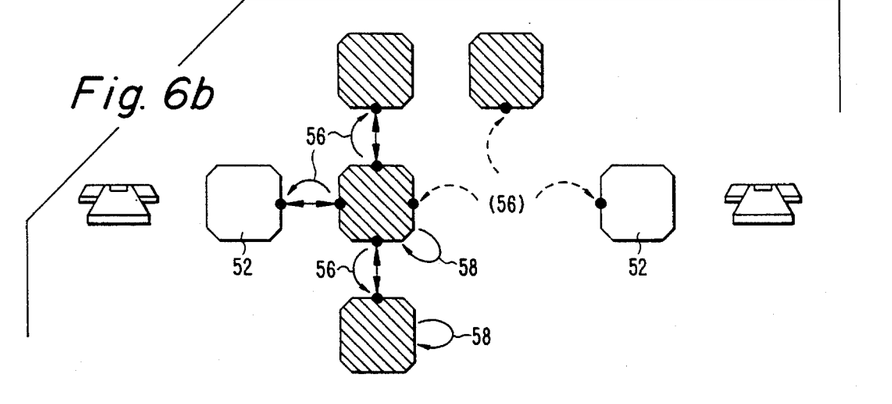
Figure 6C:
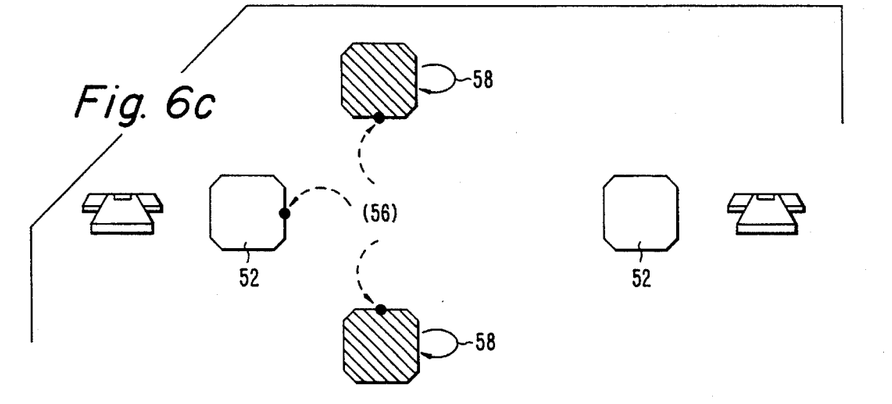
Figure 6D:
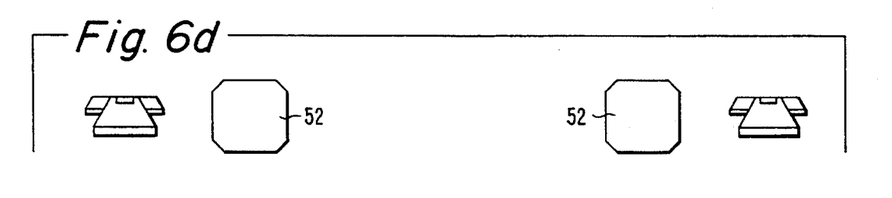

The ports 6 are also usable for indirectly attaching such resources that are administrated in a process to an activity. In the program executing in the process "Access A" in FIG. 4 there is an internal reference between the port 6, that has contact with the hardware of the subscriber A, and the port 6 that directly belongs to the link picture. Such "internal" connections may be needed when it is not desirable to terminate the current process together with the rest of the link picture. Typically, static processes are expected to survive disengagement of a link picture (c.f FIG. 6).

Of course there are a number of other types of resources which may be attached to an activity during the existence thereof, but it is always the ports and the link picture which make it possible to keep together all these resources.

Figure 5:
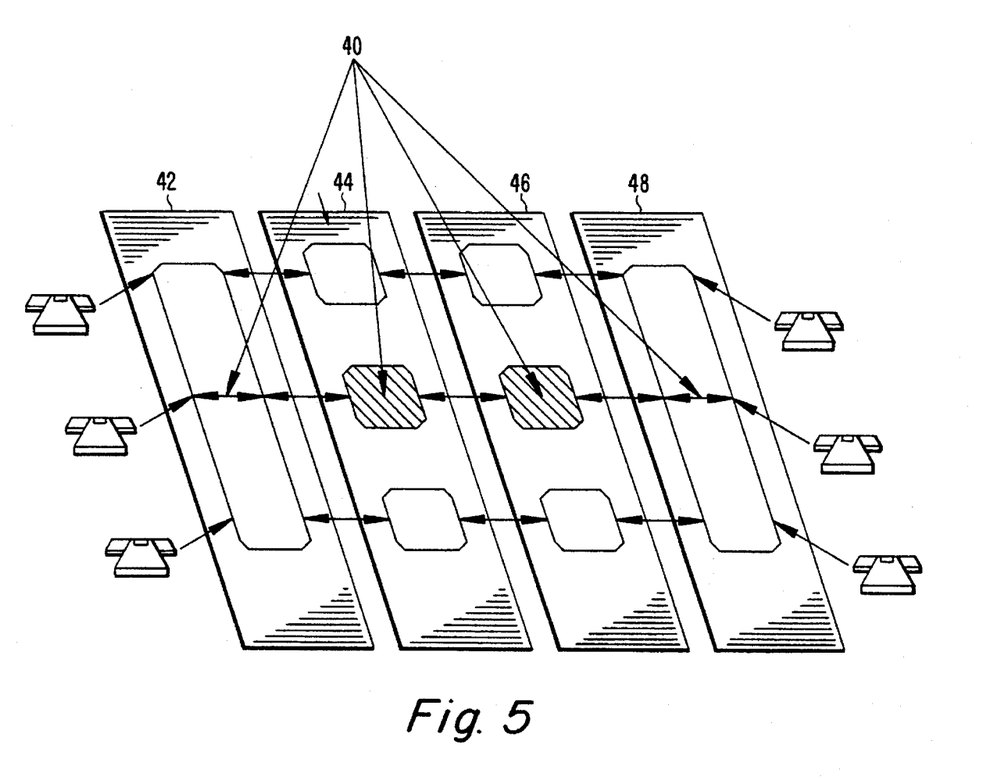
FIG. 5 is intended to illustrate that consequences of an error in an activity may be isolated to the activity itself, FIGS. 6 a–d illustrate how disengagement of an activity may be performed when an error has appeared in a process.

Due to the fact that resources and jobs belonging to an activity are kept together there is formed a new type of "domain" in the system. As illustrated in FIG. 5 this domain 40 "traverses" all the computers 42, 44, 46 and 48 involved in the call, but are on the other hand well delimited within each computer. With support of the right type of mechanisms this domain 40, i.e. the activity, may to great advantage be used as a recovery domain.

If it is possible to limit the consequences and extension of an error to keep within the activity, and simultaneously accomplish that all occupied resources are released, it is then possible, at worst, to disconnect the call controlled by the activity, whereas all other calls remain untouched.

This is in great contrast to methods according to the state of the art, where the smallest recovery domain is the separate computer. In case of more serious errors in a call the standard measure is to restart the computer, with the consequence that all calls belonging to that computer must be disconnected.

In case of a serious error appearing in one of the processes in the link picture, the normal measure is to disconnect the whole call, i.e. the activity, in a way that no "call rests" remain. If the ambition is only this, it is possible to perform this by means of the operating system itself. Release of busy resources may however be more flexible and faster if the application contains code which can handle the release.

FIGS. 6a–d illustrate the typical view when a call is disconnected due to error. In these Figures the erroneous process is designated 50, static processes 52, and dynamic processes 54. In the example shown, the chain of events extends through three steps, viz. according to Figures 6a, 6b and 6c, respectively, and results in the condition shown in FIG. 6d where only the static processes 52 remain. More particularly, every process always first sends an interruption message 56, called "ConnectionAbort" out over its links before it terminates itself according to arrows 58. For the last mentioned step the designation "ContextTerminate" is used.

An activity may also operate as a client for system updating. All, or parts, of the activity may be directed towards executing a specific version of software. If e.g. a new version of a program has been installed it is possible to create during a time "test activities" which use this program version, whereas "normal" activities still are controlled towards the old version. Later it is possible to choose to also control new "normal" activities towards the new program ware.

This requires that the activity is associated with an "activity attribute". The attribute must include a field with information about the type of activity. This attribute must follow in all messages, jobs, time supervisions and job creating resources included in the activity.

The "area of interest" of the system updating in the activity is the job chain and the job creating resources (e.g. access processes and ports) i.e. the parts of the activity which may contain a system updating attribute. The link picture is not of interest or visible from the point of view of system updating.

Figure 7:
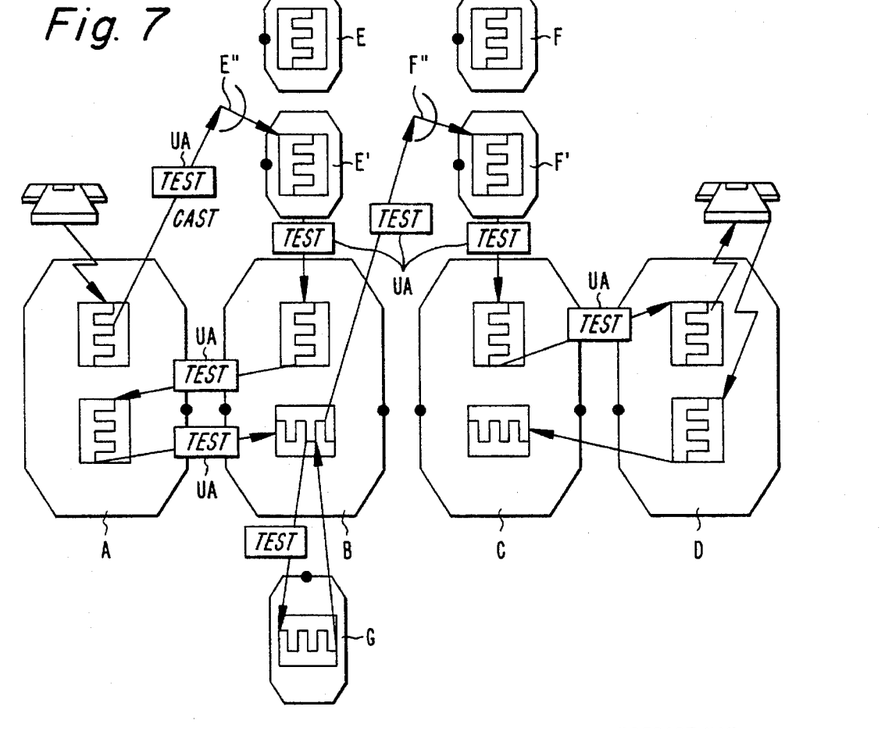
FIG. 7 illustrates system upgrading.

FIG. 7 more in detail illustrates the performance of system updating. In this Figure contexts A, B, C, D, E, E', F, F', G are shown. In one each of these contexts programs execute, which for the sake of simplicity may be assumed to have the same designation as the corresponding context. There is only one program version in the contexts A–D and G, the programs A,D and G being assumed to be of an old version, and the programs B and C of a new version. Each of the programs E and F exist in two different versions, which execute in E and E' and F and F', respectively During a certain phase of the system updating e.g. all "normal traffic" proceeds towards an "old" program version, i.e. contexts E' and F, and all "test traffic" towards "new" program version, i.e. the contexts E' and F'. The shift between the two versions according to this system is illustrated by means of arrows E" and F', which are indicated as movable. Running of test traffic is thus shown in the Figure. If only one program version exists, all traffic will necessarily be controlled towards this which thus is true for contexts A–D and G. The rectangles UA with the text "TEST" included in the Figure indicate the above mentioned system updating attribute included in the activity.

The communication service of the operating system knows the program versions which are available and controls the calls according to existing "directing rules". It should be emphasized that the "rules" which are used according to FIG. 7 only are a simplified example.

When it is necessary to trace errors the activity can also be used as carrier of tracing information. The activity attribute therefore includes a field indicating if the tracing is activated or not, and some "visibility attributes" for indicating which type of events (e.g. each message sending) that are to be "viewed" during the tracing. A tracing identity is also included. Attribute and tracing identity may indirectly, ordered by an operator, be changed wherever and whenever during the execution of the activity. If the tracing is on, the activity attaches a resource in the form of a tracing information buffer. This also follows the activity and is available in all computers where the activity executes.

Figure 8:
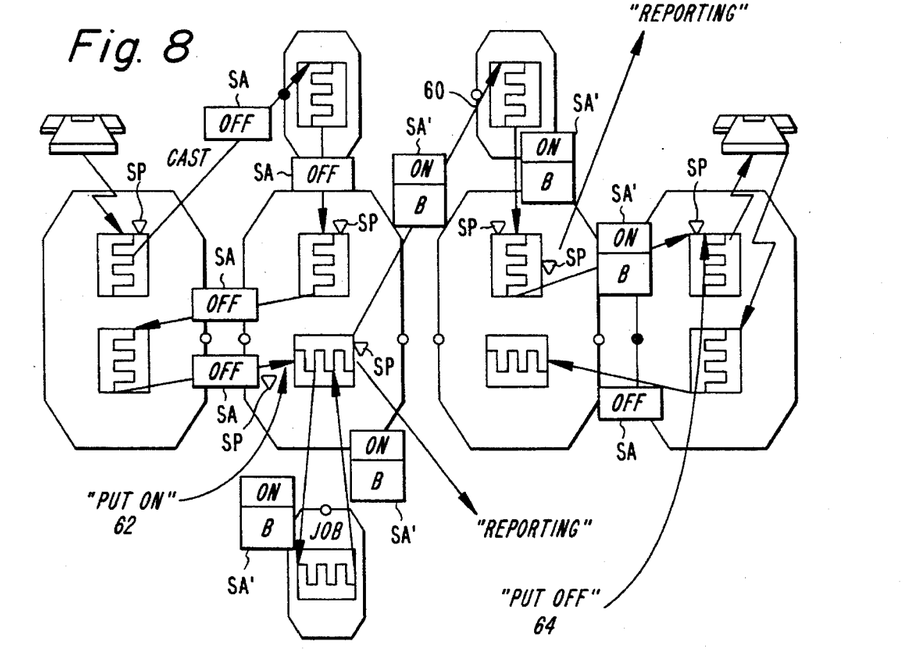
FIG. 8 illustrates the design of an error chasing system in the activity according to FIG. 1.

In FIG. 8 a started tracing in the activity according to FIG. 1 is marked with a thicker line 60. The above mentioned tracing attribute is indicated by rectangles SA, the text "OFF" and "ON" respectively, indicating that the attribute is "off" and "on" respectively The view of the tracing system of the activity is still more limited than the one for the system updating. The interest is only directed to parts of the job chain, viz. the parts following after the tracing attribute has been "put on" at 62 and up to the point (the points) 64 where it is put off again. This part 60 of the job chain may be called an execution thread. Within the execution thread it is furthermore only certain events which are of interest to be seen. The tracing attribute changes its size in the moment it is changed In the position "on", which appears in five cases at SA', the attribute contains a buffer B with tracing information. In the position "off" no such buffer is needed.

The tracing attributes may be read and changed in certain "tracing points", which are located in well defined points along the extension of the job chain. Some of these tracing points have been marked as an example in FIG. 8 as triangles SP. A tracing point is a code which is always called in case of events in the activity. The tracing point is able to read, during this call, the contents of the tracing buffer and decide, from its "visibility attribute", if the event shall be reported, i.e. be visible to the tracing operator, or not.

Examples of visibility attributes which can exist are: "Report the contents in each message which is being sent", whereupon the tracing point located in each port takes care of this being done, or "Report the identity to each job being created" resulting in one tracing point in each process creating such a report.

In order that the tracing points shall be able to both report events and also change tracing attributes it is required that they have an interface to an operator, i.e. a person. How this communication is performed does not form part of the invention, but it may be elucidating to see which type of information that passes the interface.

A typical order to be given by an operator to a tracing point is "put on the tracing attributes in all execution threads passing and put in a visibility attribute with the meaning 'report message sendings' in the buffer of the tracing attributes".

A typical report to be given by a tracing point to the operator is "A message with the identity XX and contents xyz was just sent from port No. ABC to port No. DEX".

The link picture or further resources are not of interest from the point of view of tracing.

The present invention is based on the following conditions:

All computers directly involved in the activity must work with an operating system which supports the mechanisms which are required for carrying through the invention. Computers not having such operating system must only exist as usable "resources" controlled from the activity.

The communication mechanisms of the operating system are expected to have advanced means for error detection, and possibility of reporting errors to the users, which is known per se.

The required extensions of the communication mechanisms of the operating system must not affect the executing and sending capacity more than superficially.

The system and its hardware components are assumed to be so robust that recovery measures become relatively rare. Frequent and massive recoveries would seriously affect the availability of the system.

The invention is not concerned with how static processes recover after context failure, support, if any, for recovering failed or partly failed activities—all recovery, going beyond the functionality to disconnect the activity and return the execution resources must be performed by the application itself, some mechanism for returning used resources except execution resources of the type ports and contexts.

Below a description will be given of the architecture and the principles on which the invention is based. In turn, actors in case of error situations, handling of process local errors, handling of communication errors, and errors in other processes will be treated.

Actors in case of error situations.

These are codes in a machine interpretable language which may be known per se, e.g. compiled from the programming language C++, and which can be executed in case of appearance of different types of error situations. In the below used names of the actors in question appears in some cases a syllable "Exception". This syllable is included for particularly indicating that the actor in question is executed in connection with some type of abnormal event, i.e. an exceptional event.

"ErrorHandler"

Figure 9:
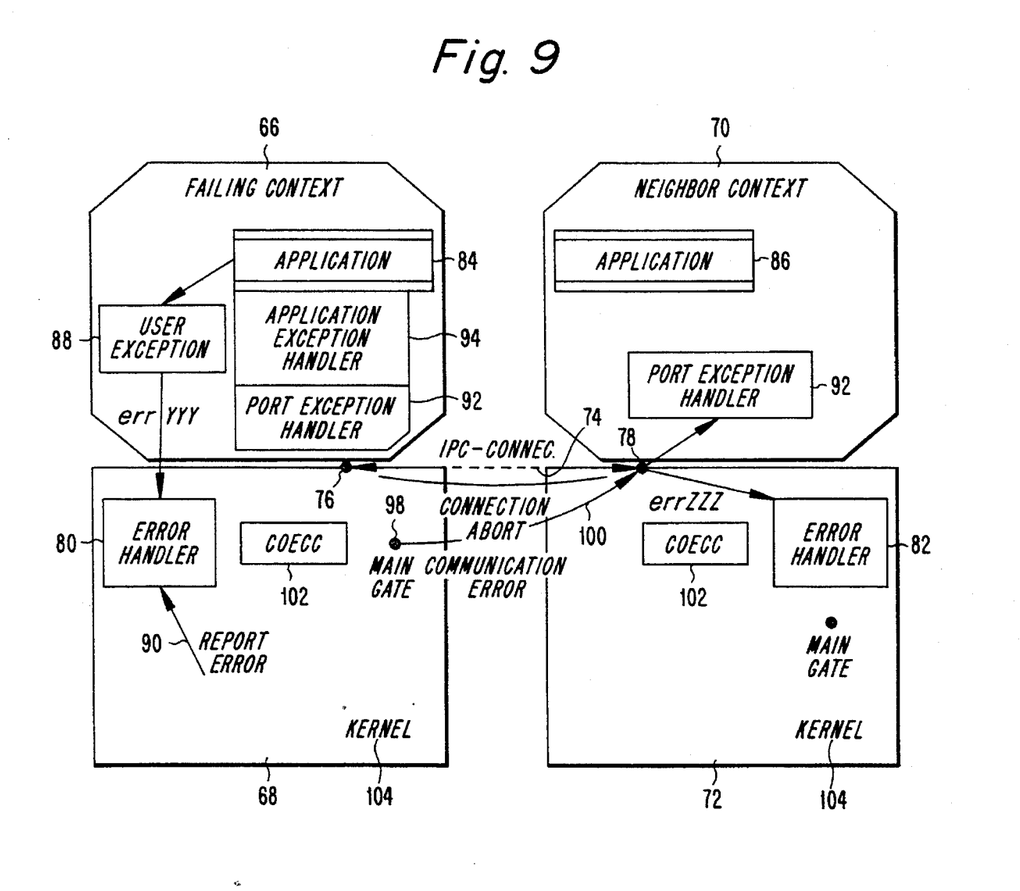
FIG. 9 shows actors performing at the appearance of an error situation in a process.

This is the error handler of the operative system. In FIG. 9, reference numeral 66 designates a faulty process and 68 an associated executive core. A neighbour process and the associated executed core are designated 70 and 72, respectively. The processes 66 and 70 communicate, indicated at 74, with each other via ports 76 and 78, respectively.

"ErrorHandler", which is indicated at 80 and 82, respectively, has as its task to receive error indications from the processor hardware and the executive core, as well as from the applications themselves, which are indicated at 84 and 86, respectively, in FIG. 9. In case of such indications "ErrorHandler" can sometimes actively intervene and control the recovery, sometimes only keep statistics over the number of errors. "ErrorHandler" is reached only by means of two calls: via the call "UserException" 88 from the application 84, and the call "reportError" 90 from the parts of the core functions executing in supervisor mode. The errors indicated are then stated in parameters following the respective calls. "UserException" is a call to be used when an error shall be reported. As a parameter in connection with this call an error code and textual error information, if any, is stated.

All error codes to "ErrorHandler" following with the call "UserException" and "reportError" will be supplemented with available error information, i.e. normally an error code and a short textual description of the error.

"PortExceptionHandler" 92

This is a specialized exception handler of the communication mechanisms of the operative system, which is called in case of link abort and communication errors. Its immediate recovery measure is to terminate the process in question and report the error to "ErrorHandler". The handler can however be rewritten or further specialized by the application designer so as to enable a more qualified recovery. This exception handler executes always in the process to which the error has been reported.

As regards error calls to "PortExceptionHandler", it is a name of the code which is executed in case of the exception call "handleException" in a function "Port" and its specializations, which will be described more closely below.

"ApplicationExceptionHandler" 94

This is the specialized exception handler of the application which is called in cases where the application is allowed to get back the control after the detection of an error. Default recovery measure is to return all resources and terminate the process in question. The handler may, however, be further specialized by the application designer, so that more qualified recovery can be done. This exception handler always executes in the process where the error has appeared.

"ApplicationExceptionHandler" is the name of a code executed after the call "UserException". "ApplicationExceptionHandler" does not handle communication errors, but only process local executing errors.

"Context"= process

Among other things, "Context" will also keep a check on which ports are attached to it. When a process gets instructions to terminate, either it is a normal or abnormal termination, it can very fast point to the ports which will be without an owner and order these to terminate themselves and their links.

A call to "Context" is "terminateProcess". This takes away the process in question, and also involved therein is that all these remaining ports shall be taken away.

"Port"

In connection with error handling a port has several tasks:

1) To receive "delete" and while performing this send out "ConnectionAbort", arrow 96, to the port, if any, 78, to which it is linked.

2) To receive error indications from other ports or from "MainGate" 98 and call "PortExceptionHandler" 92, arrow 100, with information regarding the error.

Regarding error indications to "Port" the following applies:

1) Send a message of the type "ReturnedMessage" including available error information to the port. The port will then call "PortExceptionHandler" with an error code.

2) Send a message of the type "connectionAbort" including available error information to the port. The port will then call "PortExceptionHandler" with the error code "connectionError".

3) The call "connectionAbort" gives the information to the port that the port to which it is linked does not exist any longer. This has the same importance and effect as the message "connectionAbort".

"MainGate" 98

This "port" handles some specific errors which have to be taken care of by the communication mechanisms of the operating system. Among other things it must be able to receive and handle wrongly addressed messages, as there is no destination port which can handle this. When such a message arrives, it generates a message of the type "ReturnedMessage" towards the sending port. "MainGate" is not connected to any process.

"Computer Execution Capability Control"—"COECC" 102

"COECC" has as its task to know the status of all other computers belonging to the subnet. In the case of error handling it has only one task, namely to find ports having links towards ports in a failed computer and thereafter call these with "connectionAbort". A message "statechange" gives the information that a computer in the subnet has changed its status.

"Application" 84= 86

The expression "Application" is used in a wide sense, i.e. all users of the communication mechanisms described here. In many cases it can discover errors itself, and report and even handle these.

"Kernel" 104= 68= 72

By "Kernel" is meant the executive core. It reports errors to "ErrorHandler". "Kernel" among other things includes certain parts of the communication mechanisms of the operating system, namely "MainGate" and "Port", since the error handling of these includes executing on the user process and reporting errors therefrom. "COECC" is also a part of "Kernel", but is drawn separately, since its functionality has a specific relevance in case of error detection.

No specific error calls to "Kernel" exist. In cases where "Kernel" acts in error situations it has only an active role.

Below a number of error handling situations will now be described with reference to drawing FIGS. 11–19. With respect to their general contents these drawing Figures correspond to FIG. 9 and have the same reference characters as in this Figure for designating similar functions and phenomenon. The figures appearing within brackets in the drawing figures in question indicate numbers of order for the function steps appearing in the respective Figures.

Handling of Processor local errors.

Figure 10:
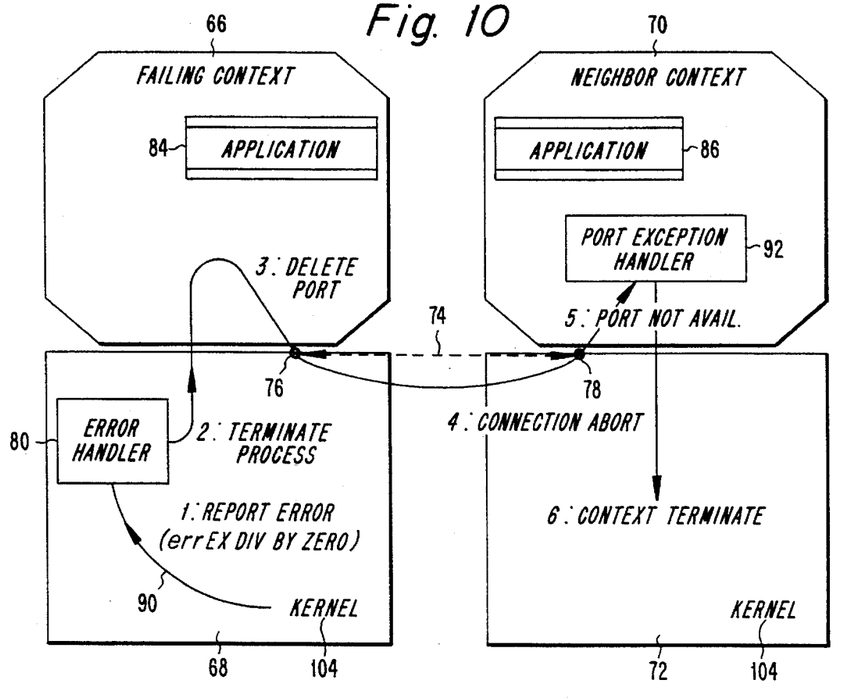
FIGS. 10–13 illustrate the handling of process local errors.

Execution errors in the application, detection by a component or the execution core. Reference is made to FIG. 10.

Errors of this type can be such as addressing beyond a permitted area, division with zero, overflow, loops etc.

The error results in an (often hardware) interruption that causes the current core function 104 to send via "reporterror" (1) an error indication 90 to the "ErrorHandler" 80 of the operating system. In case of such errors the process is always judged as unreliable, and "ErrorHandler" therefore sends "terminateProcess" (2) to the process which in turn sends "delete" (3) to the ports which are left. These in turn send "ConnectionAbort" (4) over their links. If it is the question of a static process "ErrorHandler" then creates a new process of the same type and calls the start routine of the same.

Figure 11:
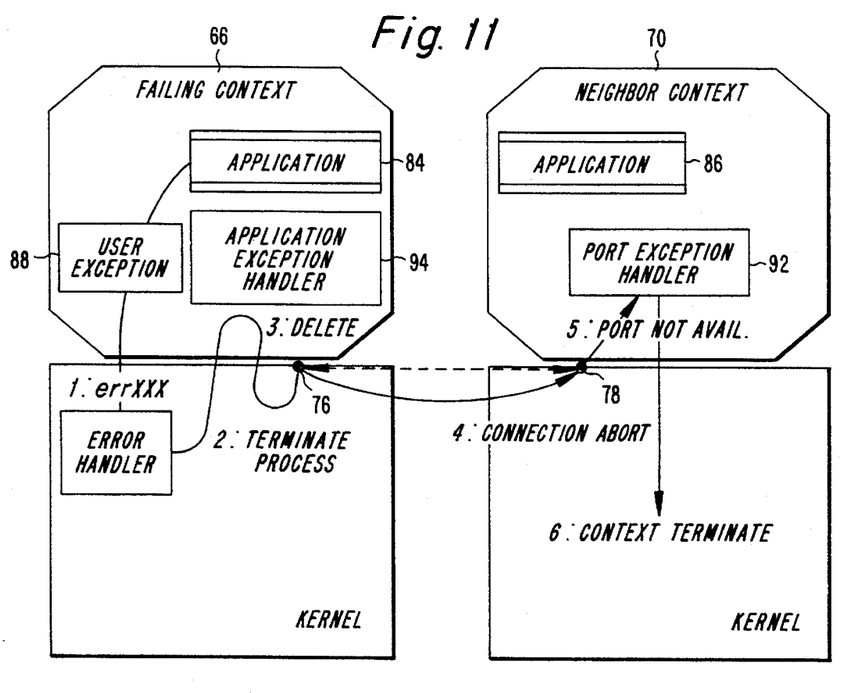

Execution errors in the application detected by the application 84 itself. Reference is made to FIG. 11.

If the application program 84 detects that some serious error has occurred during the execution it takes the initiative itself to call (1) "ErrorHandler" 90, as usual via "UserException" 88. This time the process is judged as "reliable" since it is capable of detecting and reporting the error itself. "Kernel" 104 therefore has the possibility of letting the control return to the specialized "ApplicationExceptionHandler" 94 of the application. Default measure for this should nevertheless consist in terminating the process with "TerminateProcess" (2), whereupon everything proceeds as in the present case with "delete" (3) and "ConnectionAbort" (4).

Figure 12:
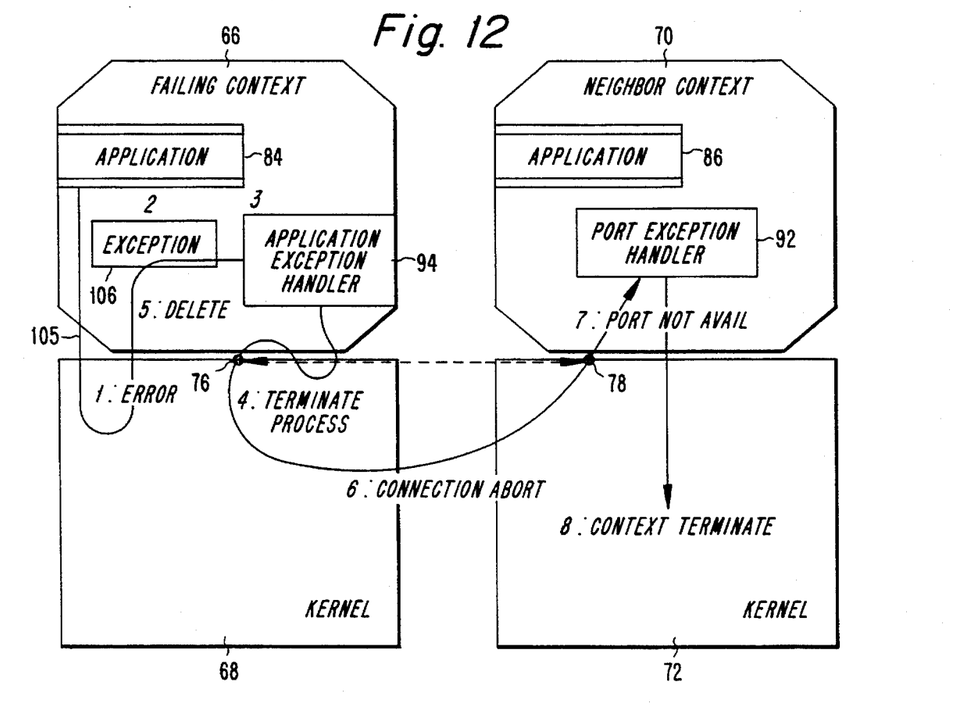
Figure 13:
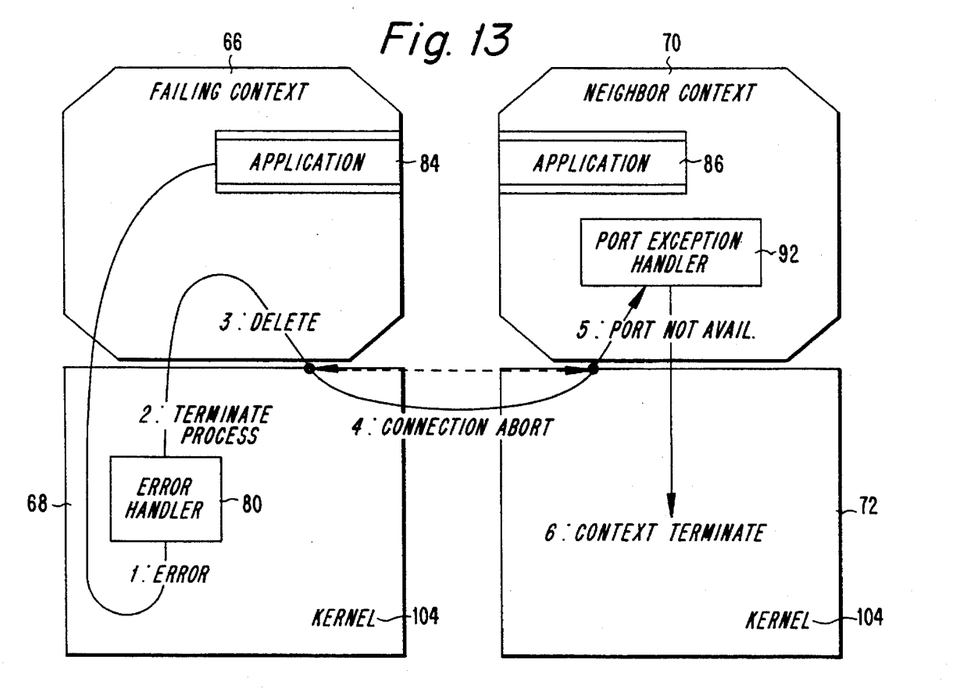

Error in case of system call. Reference is made to FIG. 12 and 13.

If a serious error is detected by the core 68 during a system call 105 the return value from the core will indicate this (1) according to FIG. 12. An "Exception" 106 is thrown (2) to the application so that the "ApplicationExceptionHandler" 94 itself of the application program can take care of the error (3). After this the case enters that just described with reference to FIG. 11, with "terminateProcess" (4), "delete" (5) and "ConnectionAbort" (6) with termination, if any, (8) of the process.

In case of certain errors the core 104 can, however, directly draw the conclusion that the process is unreliable. In such cases the core reports (1) instead directly to "ErrorHandler" 80, according to FIG. 13, and this then terminates the process (2). The continuation is the same as in FIG. 12.

Handling communication errors.

Lost message.

If a message of the type "Call" or "Reply" has been lost this will be detected by a time supervision of the original calling part being released. In the case "CallReply" it is the calling port that orders time supervision, and when this is released the relevant error code is returned as a reply to the call "Call". The continuation will be exactly the same as for failed system calls, as has been described earlier with reference to FIGS. 12 and 13.

If the lost message is a "Cast" it is instead the calling application itself which orders the time supervision. When this is released the calling part is in the same situation as in the case already described with reference to FIG. 11.

Figure 14:
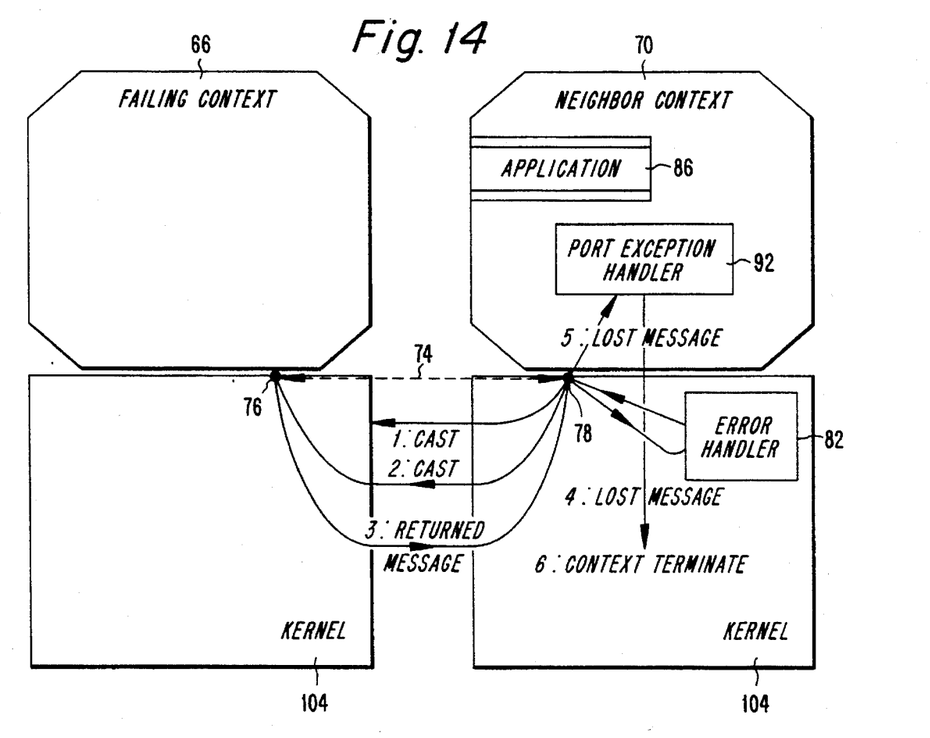
FIGS. 14–16 illustrate the handling of communication errors.

With reference to FIG. 14 lost messages can also be detected by sequence enumeration For e. g. "Call", "Cast" and "Reply" the following appears. In case of a two-way link all messages sent over this will be sequence enumerated, so that the receiver can detect gaps in the enumeration. The following can happen. The calling part sends a sequence enumerated message, which is lost on its way (1). The calling part sends its next message (2), the sequence number of which is incremented with one. The receiving port 76 detects the gap in the enumeration and sends a message to the calling part 78 of the type "ReturnMessage" (3) with information regarding the missing number. The port 78 first calls "ErrorHandler" 82 (4) and then "PortExceptionHandler" 92 with an error code "LostMessage" (5), whereupon "PortExceptionHandler" makes some form of recovery.

Figure 15:
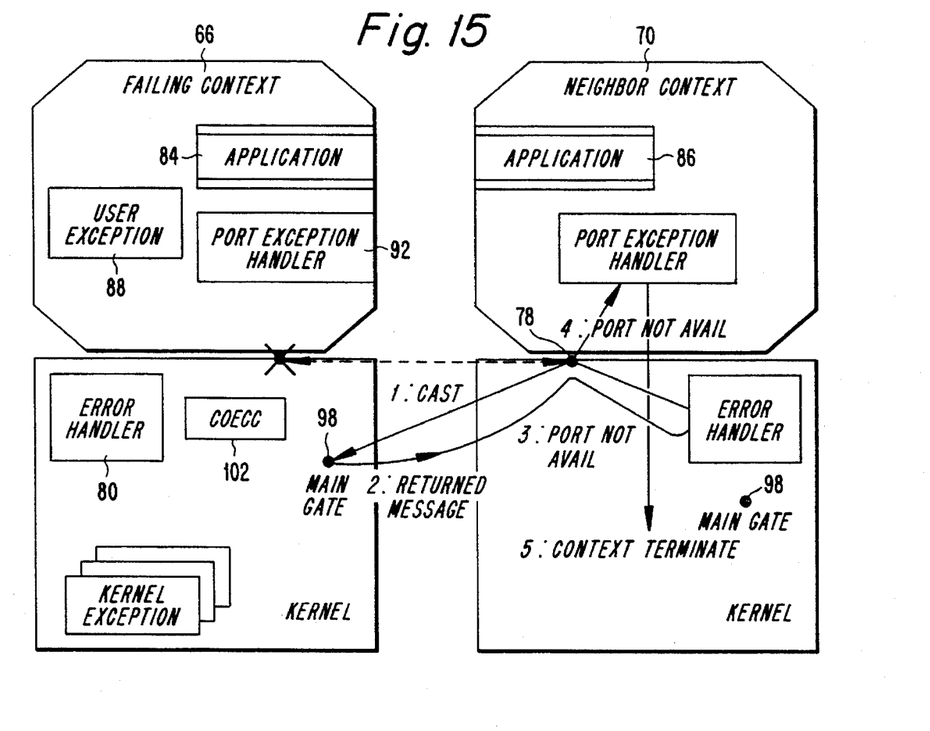

Wrongly addressed message. Reference is made to FIG. 15.

A message 130 (1) which for some reason includes an erroneous destination address (a portname not published, an old port reference or similar) will appear in "MainGate" 98. This then sends a message (2) of the type "ReturnedMessage" to the port 78 of the sender. The port 78 first calls "ErrorHandler" 82 (3) and then "PortExceptionHandler" 92 (4) with the error code "PortNotAvailable". Thereafter the case can be brought back to those earlier described.

Disconnected contact.

Figure 16:
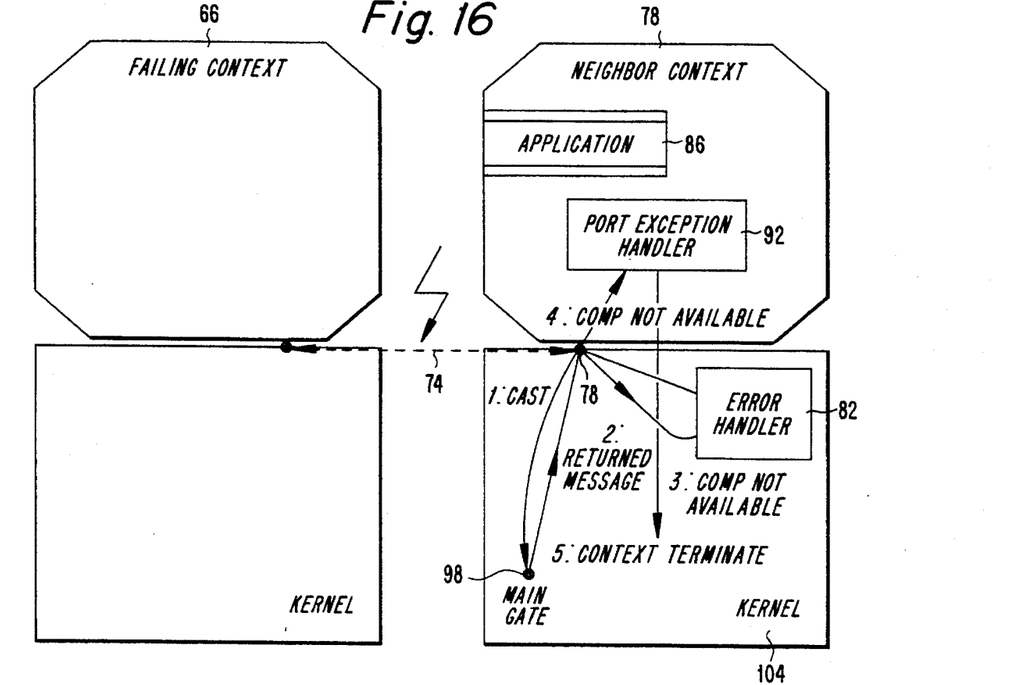

If the contact 74 to another computer is broken this may be detected in two ways:

1) Reference is made to FIG. 16. An emitted message will not arrive. Instead it will appear in "MainGate" 98 of the computer to which it has arrived (1). As in the former case this will send a "ReturnedMessage" to the sender port 78 (2), whereupon the case can be brought back to the former one described with reference to FIG. 15, although with another error code, namely "ComputerNotAvailable".

2) The link supervision of the sender port detects that the destination can no longer be reached, and calls with "reportError" to the "ExceptionHandler" (not shown). Thereafter the case will be the same as case (1).

Errors in other Processes.

Figure 17:
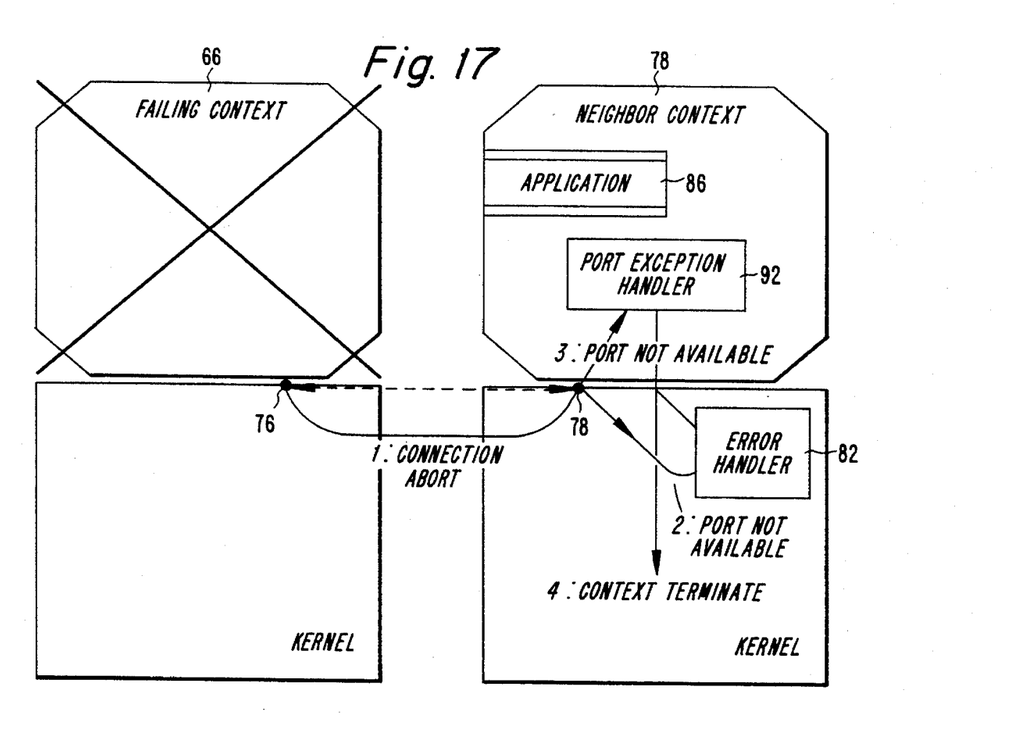
FIGS. 17–19 illustrate the handling of errors in other processes, FIG. 20 in a table sums up error cases described with reference to FIGS. 6–19.

Failed process in own or other computer. Reference is made to FIG. 17.

When a process 66 fails (i.e. is terminated by "ErrorHandler"), but the computer, on which it was executing still is intact, all its linked ports, such as 76, will send out "ConnectionAbort" (1) over its links. This results in a call with an error code (2), first to "ErrorHandler" and then to "PortExceptionHandler" 92 in the receiver process 70, which performs default or a specified recovery.

Figure 18:
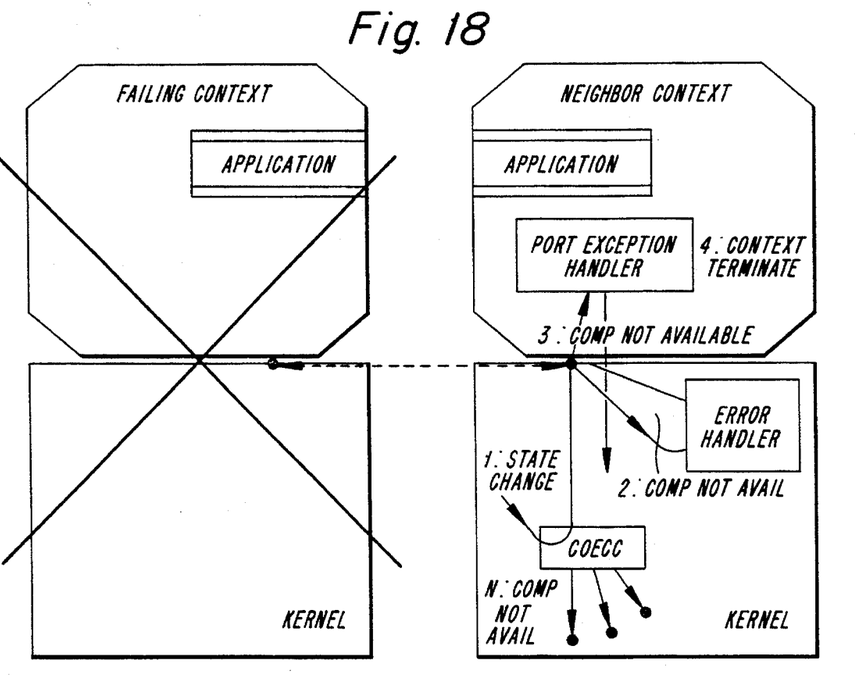

Failed computer in own subnet. Reference is made to FIG. 18.

If a computer in the own subnet fails, "COECC" 102 will very soon be informed about that with "StateChange" (1). "COECC" will then find out the ports having links directed towards this computer, and calls these with "ComputerNotAvailable" (N). Each port then calls "ErrorHandler" and its own "PortExceptionHandler" with "ComputerNotAvailable". Thereafter the course of events proceeds analogously with other errors of the same type.

Figure 19:
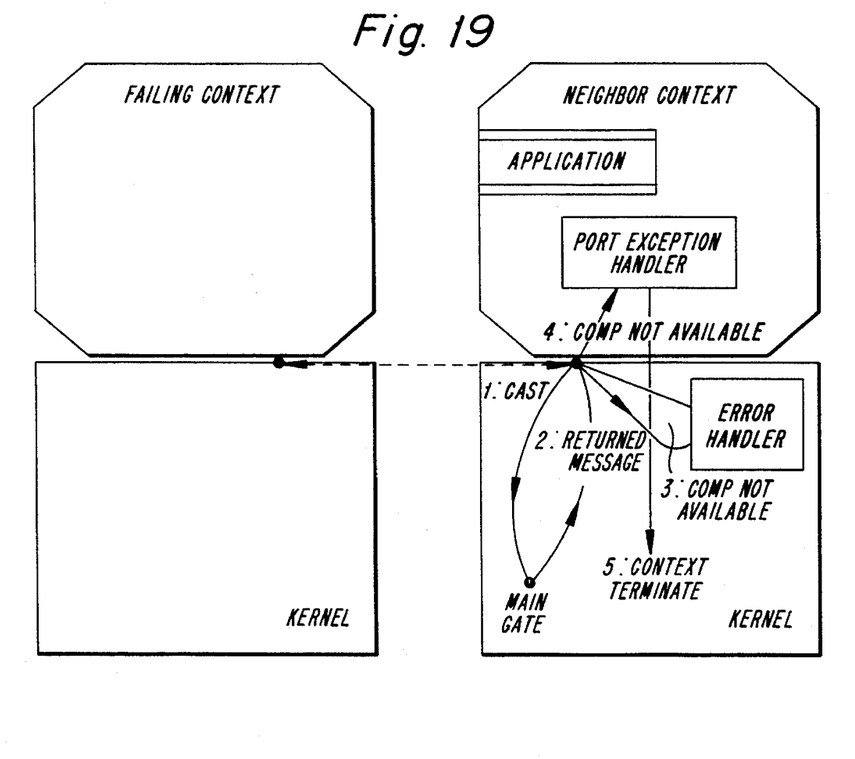

Failed computer in another subnet. Reference is made to FIG. 19.

If a computer in another subnet fails, "COECC" will not be informed. The disappearance of the computer will be detected either by no message arriving or by the link supervision of the operating system. The case is therefore in practice the same as the case described earlier with reference to FIG. 16, and is detected and treated the same way.

Loops in other processes.

Infinite program loops are detected in two ways:

1) "Kernel" detects the loop and releases the same chain of events as described with reference to FIG. 10.

2) The time supervision in the calling process releases. The case then passes into the case "Lost messages" as described above, c.f. FIG. 14.

The error cases described above i.e. with reference to FIGS. 11–19, are. also summed up in FIG. 20. The table contains the abbreviation IPC, which refers to the communication mechanisms of the operating system.

In the above description of different error cases with reference to the drawings no closer description in detail has been given of software and hardware, to be used, or of how the described functions and processes are performed in practice, since it is presupposed to be clear to one skilled in the art how the invention shall be practiced guided by the description and the drawings. The invention may also be used in known operating systems and does not presuppose any special hardware.

What is claimed is:

1. A method in a distributed operating system for enabling demounting of a chain of linked processes, wherein each process is a resource for executing applications in said operating system, and for use by a job in order to enable execution of program code in process, the job being a phenomenon which is directed to said process in order to cause execution of a method in an object owned by the process, the job also being able to create new jobs directed to other processes or towards an own process, and wherein said process provides the job with resources and synchronizes jobs by only allowing one job at a time to execute, said method comprising the steps of:

providing communication links between said processes by associating communication ports as a property of the processes, wherein the communication ports are operating system resources for enabling the processes to be linked together to form a link picture in which each port of a process has a reference to a port of another process, and wherein knowledge of the link picture is limited to each port's information formed by the references;

using said distributed operating system for keeping up with processes of the link picture, and using said ports for transferring termination-related information if a corresponding process is terminated;

detecting an error in a faulty one of the processes and terminating the faulty process;

transferring information via said ports regarding a process or computer failure, and propagating the transferred information through a whole chain of linked processes in the link picture; and reporting the transferred information to running applications being executed in said linked processes for enabling the running applications to perform application specific recoveries.

2. The method according to claim 1, comprising the further step of sending error tracing attributes from job to job in a chain of linked processes.

3. The method of according to claim 2, further comprising the step of allowing change of value of said error tracing attributes at any time during execution of a job chain.

4. The method according to claim 2, comprising providing one of said error tracing attributes with a tracing buffer able to store information regarding events in said system traced by said one of said error tracing attributes; and creating by means of said information a log of said events.

5. The method according to claim 1, further comprising the steps of:

providing in said system a system updating function;

providing system updating information attributes able to carry information internal to said updating function regarding type of traffic carrying on in the system; and transferring said information attributes in a chain of jobs, wherein, upon occasion of executing a specific program, the transferred information attributes are utilized for making a determination of version of the specific program.

6. A system for demounting a chain of linked processes in a distributed operating system, wherein each process is a resource for executing applications in said operating system, and for use by a job in order to enable execution of program code in the process, the job being a phenomenon which is directed to said process in order to cause execution of a method in an object owned by the process, the job also being able to create new jobs directed to other processes or towards an own process, and wherein said process provides the job with resources and synchronizes jobs by only allowing one job at a time to execute, the system comprising:

first means for providing communication links between processes by associating communication ports as a property of the processes, wherein the communication ports are operating system resources for enabling the processes to be linked together to form a link picture in which each port of a process has a reference to a port of another process, and wherein knowledge of the link picture is limited to each port's information formed by the references;

second means for enabling said distributed operating system to keep up with processes of the link picture, and to use said ports for transferring termination-related information if a corresponding process is terminated;

third means for enabling said distributed operating system, and in certain cases a process itself, to detect an error in a faulty one of the processes and terminate the faulty process;

fourth means for enabling said distributed operating system to transfer failure information via said ports regarding a process or computer failure, and to propagate the transferred failure information through a whole chain of linked processes in the link picture; and fifth means for enabling said distributed operating system to report said failure information to running applications being executed in the linked processes in order to enable the running applications to perform application specific recoveries.

7. The system according to claim 6, further comprising:

communicating mechanisms;

process ports included in said first means, for performing communication between processes; and communication ports not connected to a process for handling specific errors which have to be dealt with by said communication mechanisms of the operating system, wherein said process ports have in connection with error handling the task of receiving a "delete" instruction relating to its own process, and while executing this instruction, sending a link disconnecting message, to any port, to which it is linked, and receiving error indications from other process ports and from any communication port, and calling code in said communication mechanisms for transferring information thereto regarding a corresponding error in such an error indication.

8. The system according to claim 7, wherein said second means includes process ports.

9. The system according to claim 7, wherein said third means includes the distributed operating system and processes.

10. The system according to claim 7, further comprising an exception handling code included in said fourth means and always executing in a process, to which an error is reported, the exception handling code having the function of:

being called in case of link abort and communication errors;

terminating an erroneous process; and reporting the error to an error handling code.

11. The system according to claim 7, further including error tracing attributes to be sent from job to job in a chain of linked processes.

12. The system according to claim 11, further comprising means for allowing change of value of said error tracing attributes at any time during execution of a job chain.

13. The system according to claim 10, wherein one of said tracing attributes is associated with a tracing buffer for storing information regarding events in said system when traced by said one of said tracing attributes, said system further comprising means for creating by means of said information a log over said events.

14. The system according to claims 6, further comprising:

a system updating function;

system updating information attributes for carrying information internal to said updating function regarding type of traffic carrying on in the system; and means for transferring said information attributes in a chain of jobs for enabling determination of the version of a specific program to be executed at an execution occasion.

* * * * *